L. FIEDLER.
BATTERY CHARGING AND DISCHARGING SYSTEM.
APPLICATION FILED FEB. 25, 1907.
957,321.
Patented May 10, 1910.
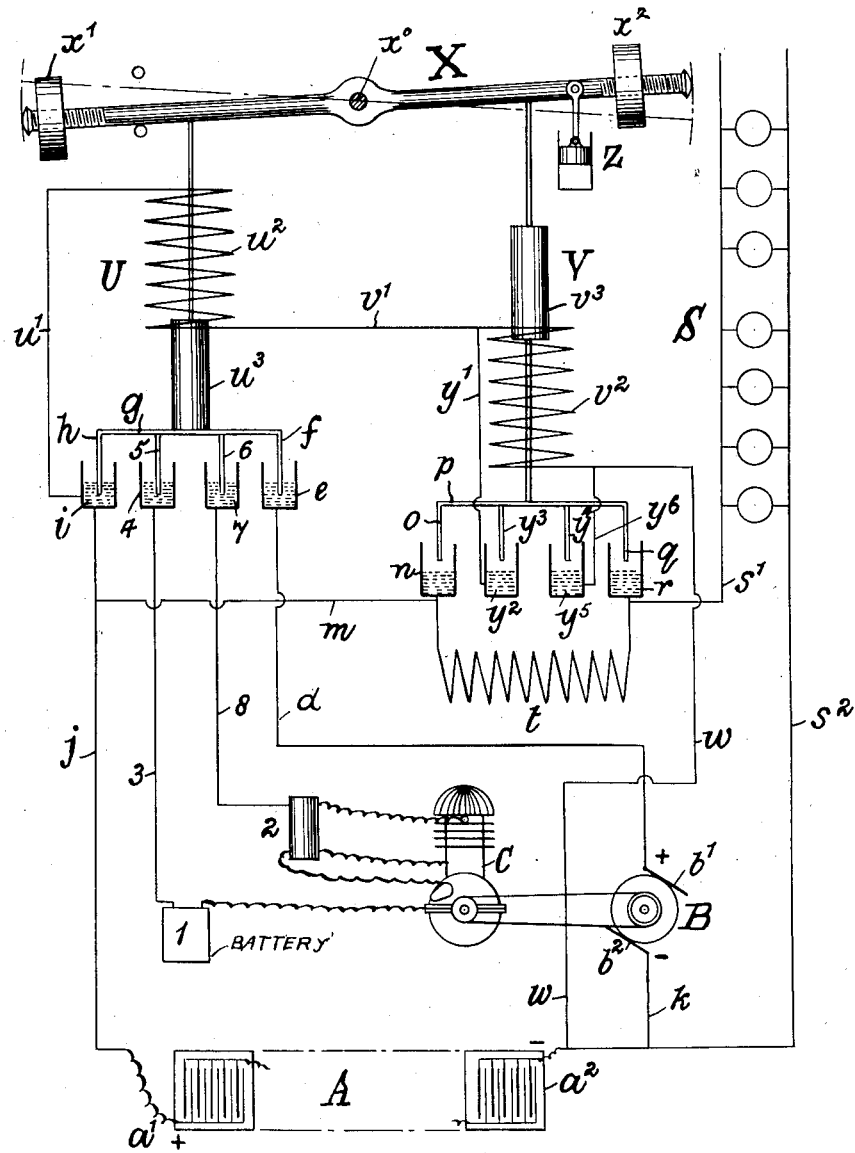
WITNESSES
INVENTOR
Lothar Fiedler
ATTY United STATES PATENT OFFICE.

LOTHAR FIEDLER, OF STOKE NEWINGTON, LONDON, ENGLAND.

BATTERY CHARGING AND DISCHARGING SYSTEM.

957,321.

Specification of Letters Patent.

Patented May 10, 1910.

Application filed February 25, 1907. Serial No. 359,256.

*To all whom it may concern:*

Be it known that I, LOTHAR FIEDLER, of Stoke Newington, in the county of Middlesex, England, have invented certain new and useful Improvements in and Relating to Battery Charging and Discharging Systems; and I do hereby declare the following to be a full, clear, and exact description of the invention, such as will enable others skilled in the art to which it appertains to make and use the same.

This invention relates to an improved contrivance whereby a secondary battery, which is associated with a dynamo or other source of electricity, may be caused automatically to re-charge itself from the source of electricity when it has become depleted of its charge to a pre-arranged degree, the arrangements being such that, when the battery has become fully re-charged, the dynamo, or other source of electricity, will be automatically cut out of the circuit and, during the process of re-charging, a resistance to the flow of electricity to effect electric lighting or for other purposes is temporarily interposed, which resistance will be cut out when the secondary battery becomes fully re-charged and resumes the duty of supplying the required electricity. Moreover an internal combustion motor, or other motor which requires the expenditure of energy to start it, being provided to drive the dynamo, the contrivance is adapted to automatically set the motor at work, which motor will be stopped when the battery has become fully charged.

On the accompanying drawing is shown an arrangement of the organs which is adapted to perform automatically the cycle of operations above described.

In this drawing, A is an accumulator or secondary battery which is adapted to be charged from any available source of electricity which may be immediately drawn on or, as represented in the drawing, from a dynamo B, by which the electricity will be generated on the starting of a motor C. The electric circuit through the dynamo and accumulator comprises the positive pole $b^1$ of the dynamo, a lead $d$ to a dipping contact composed for example of a cup of mercury $e$, a contact rod $f$, a bridge $g$, a second contact rod $h$, mercury cup $i$, and lead $j$ which is connected to the pole $a^1$ of the accumulator, which pole is the positive pole when the accumulator is discharging, the other end of the accumulator $a^2$ being joined to the negative pole $b^2$ of the dynamo B by the lead $k$.

An alternative circuit through the accumulator A and the service leads, when the accumulator is discharging, comprises the lead $m$, the cup of mercury $n$, the rod $o$, the bridge $p$, rod $q$, mercury cup $r$ and service wire $s^1$, the return, after traversing the contrivances which are required to be supplied with electrical energy and which are represented by S, taking place through $s^2$ back to the pole $a^2$ of the secondary battery. In the position shown on the drawing this alternative discharging circuit is incomplete by the fact that the rods $o$ and $q$ are raised out of the cups of mercury $n$ and $r$ respectively, but an alternative route for the completion of this circuit is provided through a resistance $t$ permitting electrical energy to be available in the service wires but of less potential than that derivable from the dynamo which for the time is being employed in re-charging the accumulator. Of the first described charging circuit there is a parallel shunt circuit which starts from the cup $i$ comprises the lead $u^1$, the coil $u^2$ of the solenoid U, the lead $v^1$, the coil $v^2$ of the solenoid V and a return lead $w$ to $a^2$ and $b^2$.

While the current can find its way freely through the accumulator the solenoids will not be greatly energized on account of the considerable resistance due to the coils $u^2$ and $v^2$ of the solenoids but, as the accumulator becomes more and more charged, the flow through it will be opposed by the gradually rising internal potential and presently the solenoids will become sufficiently energized to overcome the opposing force acting on the cores $u^3$ and $v^3$. These cores are suspended from a lever X which is pivoted at $x^0$ and provided with adjustable weights $x^1$ $x^2$. The distance of $x^1$ from $x^0$ is made greater than the distance of $x^2$ from $x^0$ so that until the accumulator has become nearly charged the lever X will stand inclined as shown, but when the solenoids become fully energized as above described, both cores will be attracted into their coils, $u^3$ by rising and $v^3$ by descending, the lever X taking the position shown in dotted lines. In this altered position the charging circuit will be broken by the rods $f$ and $h$ being lifted out of the cups $e$ and $i$ and the alternative circuit, previously described, along the bridge $p$ and the service wires $s^1$ $s^2$ will be completed by the entry of the rods $o$ $q$ into the cups of mercury $n$ and $r$. The completion of this circuit will virtually cut out the resistance $t$ and the whole potential of the secondary battery will be available for the service of S.

In the altered position of the lever X the portion of the shunt circuit through the coil $v^2$ of the solenoid V will be virtually cut out by being short circuited through a lead $y^1$, a cup $y^2$, a rod $y^3$, a portion of the bridge $p$, a rod $y^4$, a cup $y^5$ and a lead $y^6$. The effect will be to temporarily eliminate the downward pull on the core $v^3$ of the solenoid V while the core $u^3$ of the solenoid U will be wholly or partly sustained by the still energized coil $u^2$.

As the accumulator becomes discharged the sustaining effort on the core $u^3$ will diminish, and after a time, when the accumulator has become discharged to a predetermined degree, the left end of the lever X will again drop and the charging of the accumulator will re-commence. The degree to which the accumulator is permitted to run down before re-charging commences can be regulated by adjusting the positions of the weights $x^1$ $x^2$. By means of a dash pot Z abrupt movement of the lever X will be prevented. The dynamo B is driven by an internal combustion engine C, the ignition spark of which is provided from a battery 1 and induction coil 2, the ignition circuit comprising the leads 3, the cup 4, the rod 5, the bridge $g$, the rod 6, the cup 7 and the lead 8. With this arrangement, when the accumulator has become fully charged, not only will the charging circuit be broken but also the ignition circuit, causing the engine to stop. When it is requisite to commence re-charging the ignition circuit will be again completed through the bridge $g$. The electric energy still left in the accumulator will then re-start the engine through the medium of the dynamo B supposing the field magnets to be shunt wound and when re-started the dynamo will be driven by the engine and re-commence the charging of the accumulator.

I claim.

1. Means for automatically maintaining an accumulator in a charged condition, comprising a source of electricity, a circuit leading from the positive pole thereof to that pole of the accumulator which is positive on discharging, a shunt circuit, a pair of solenoids in said shunt circuit, and means adapted to open the charging circuit and short circuit one of the solenoids on the accumulator becoming fully charged and to close the charging circuit and cut in the said solenoid on the accumulator becoming sufficiently discharged.

2. Means for automatically maintaining an accumulator in a charged condition, comprising a source of electricity, a circuit leading from the positive pole thereof to that pole of the accumulator which is positive on discharging, a shunt circuit, a pair of solenoids in said shunt circuit, and means adapted to open the charging circuit and short circuit one of the solenoids on the accumulator becoming fully charged and to close the charging circuit and cut in the said solenoid on the accumulator becoming sufficiently discharged, comprising a switch in the charging circuit connected with the core of one solenoid, a switch in the shunt around the other solenoid and connected to the core thereof, and means for withdrawing the cores of the solenoids from their windings.

3. Means for automatically maintaining an accumulator in a charged condition, comprising a source of electricity, a circuit leading from the positive pole thereof to that pole of the accumulator which is positive on discharging, a shunt circuit, a pair of solenoids in said shunt circuit, and means adapted to open the charging circuit and short circuit one of the solenoids on the accumulator becoming fully charged and to close the charging circuit and cut in the said solenoid on the accumulator becoming sufficiently discharged, comprising a switch in the charging circuit connected with the core of one solenoid, a switch in the shunt around the other solenoid and connected to the core thereof, and a lever which tends to assume one position connected to the cores of both solenoids.

In testimony whereof I have hereunto set my hand in the presence of two subscribing witnesses.

LOTHAR FIEDLER.

Witnesses:
FREDERICK W. LANE,
H. D. JAMESON.